United States Patent
Petromanolakis

[11] Patent Number: 5,566,634
[45] Date of Patent: Oct. 22, 1996

[54] SHIP'S STEM DUCT WITH AIRFOIL SECTION

[76] Inventor: Emanuel E. Petromanolakis, 12 Pantokratoros Street, Peristeri, Athens, Greece

[21] Appl. No.: 406,420

[22] Filed: Mar. 20, 1995

[51] Int. Cl.⁶ .................................................. B63B 1/32
[52] U.S. Cl. ............................................ 114/56; 114/67 R
[58] Field of Search ............................... 114/56, 67 R, 114/166, 274; 440/67

[56] References Cited

U.S. PATENT DOCUMENTS

| | | |
|---|---|---|
| 1,258,554 | 3/1918 | Furness . |
| 1,859,139 | 5/1932 | Hanlon . |
| 2,139,594 | 12/1938 | Kort .................................. 440/67 |
| 2,649,266 | 8/1953 | Darrieus . |
| 2,767,678 | 10/1956 | Vertens ............................ 114/274 |
| 3,302,603 | 2/1967 | Eckert . |
| 5,046,444 | 9/1991 | Vorus ............................... 114/274 |

FOREIGN PATENT DOCUMENTS

| | | |
|---|---|---|
| 1017897 | 12/1952 | France . |
| 927256 | 5/1955 | Germany . |
| 931090 | 8/1955 | Germany ........................... 114/67 R |
| 1181090 | 11/1964 | Germany ............................... 440/67 |
| 3224390A1 | 1/1984 | Germany . |
| 230848A1 | 12/1985 | Germany . |
| 59-67191 | 4/1984 | Japan . |
| 997188 | 7/1965 | United Kingdom .............. 114/274 |
| 1369205 | 10/1974 | United Kingdom ................ 440/67 |
| WO92/22456 | 5/1992 | WIPO . |

*Primary Examiner*—Sherman Basinger
*Attorney, Agent, or Firm*—Dowell & Dowell

[57] ABSTRACT

A stem duct of a ship used to achieve the reduction of the ship's propulsion wave height and the improvement in the laminarity of the flow around the ship's bow, so that the ship is able to move with an increased speed and/or with reduced fuel consumption. The duct is mounted on each side of the bow frontal surface and has an airfoil section fitted, arranged in the direction of the flow, with its leading edge at the duct inlet and its trailing edge at the duct outlet. Following mounting of the duct, a passage is created for the flow, between the duct's interior surface, consisting of the convex airfoil surface, and the ship's bow surface. The flow passing through the passage acquires an increased speed and a reduced pressure, thereby leading to an improved slip of the ship.

19 Claims, 7 Drawing Sheets

SHIP'S STEM DUCT WITH AIRFOIL SECTION

THE FIELD OF THE ART

The present invention refers to the technical field of hydrodynamics, and in particular to the means and methods for improving the flow characteristics of sailing vessels. Specifically, it refers to the stem duct of a ship, featuring an airfoil section, and achieving a significant improvement in the ship's flow characteristics.

THE PRIOR ART

In shipping technology in general, efforts have been made to reduce the frictional resistance and the wave making resistance encountered by ships, and, consequently, to improve their sailing through the compact mass of water they traverse. For this reason, and especially for the limitation of the height of the bow wave that the ship has to encounter, a technique has been established, according to which the fore body of the ship's hull is modulated in a bulb or ball shape. In this way, the wave making resistance encountered by the ship is reduced.

The ship's frontal surface though, namely the extensive bow area participating in the process of making way to propel the ship through the water, is very wide. Taking into consideration that the propulsion resistance is proportional to the square of the ship's velocity, then the increase of power needed to overcome this resistance, is also proportional.

To overcome this problem and to reduce the propulsion resistance and the wave making energy that the ship's frontal surface encounters, the attachment of a duct on the ship's stem has been proposed in the past (E. E. Petromanolakis, WO 92/22456). As the ship impacts to the water mass through this duct, which extends in height above and beneath the ship's waterline, and not with its entire frontal surface, the reduction of the wave making resistance created by the ship's propulsion is expected. It was not possible however for such a duct—acting as a wave making resistance absorber—to produce the expected results, since it was not possible to differentiate the flow through the duct from the sea water flow around the frontal surface of the ship significantly, although a small variation was possible. Other attempts of the prior art, like the French Patent FR-A-1 017897, have produced negative results, since not only they did not achieve the reduction of the wave making resistance developed during ship's propulsion, but furthermore they comprised moving parts, which required the supply of power by the ship's main engine. The result was negative as far as the power required for the ship's propulsion was concerned.

Further, WO-A-82 03055 (SEE) proposes a pipe to convey water from the stem to the stern of the ship, in order to use it at this point for the propulsion of revolving elements. This is a totally different aspect; furthermore it is highly uncertain if it can be implemented, because of the friction, the turbulence etc.

SUMMARY OF THE INVENTION

Thus, the main object of the present invention is to effectively overcome the abovementioned disadvantages and drawbacks of the prior art. It is also an object of the invention to propose a ship's stem duct with such a shape and arrangement, that will ensure the alteration of the characteristics of the flow, passing between the interior surface of the duct and the frontal surface of the ship. Specifically, it is an object of the invention to create an increased water flow velocity through the passage, defined by the stem duct and the ship's frontal surface, causing the reduction of pressure and a proportional decrease in the resistance to the ship's propulsion. In this way, the ship's slip is improved and the result is a speed increase and/or a decrease of the power consumption with corresponding reduction in the fuel consumption.

Furthermore, it is an object of this invention to propose the best shape and arrangement of the proposed stem duct, where the preferred shape is that of an airfoil.

All these and other objects, characteristics and advantages of the present invention, will be clarified in the detailed description below.

BRIEF DESCRIPTION OF THE DRAWINGS

The present invention will be made, clear to those skilled in the art, by reference to the accompanying drawings, in which are depicted some illustrative but not restrictive embodiments of the invention.

DETAILED DESCRIPTION OF PREFERRED EMBODIMENTS

Referring now to the accompanying drawings, we will describe certain preferred, illustrative embodiments of the inventions.

Figure 1:
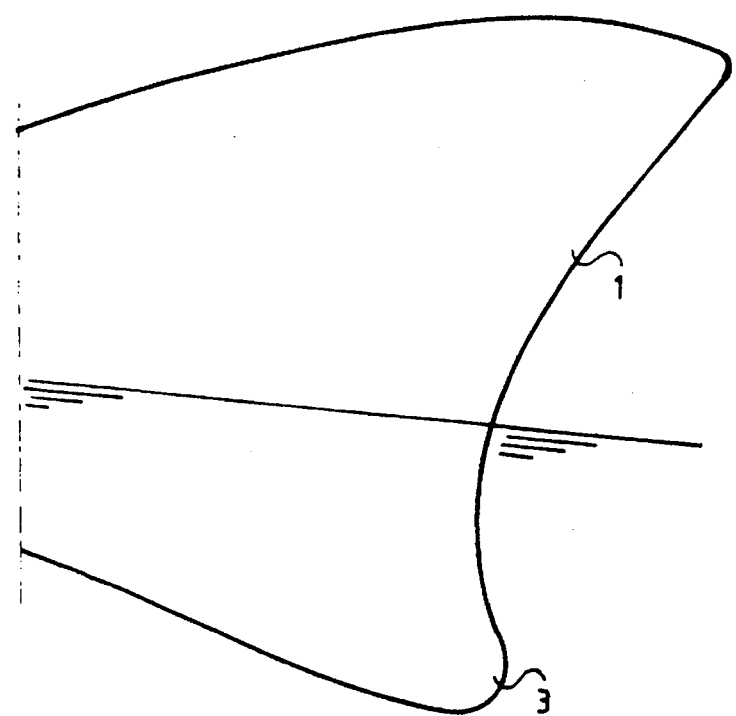
FIG. 1 presents a side view of a ship with a bulb/ball stem, without a propulsion resistance reducing stem duct.
Figure 2:
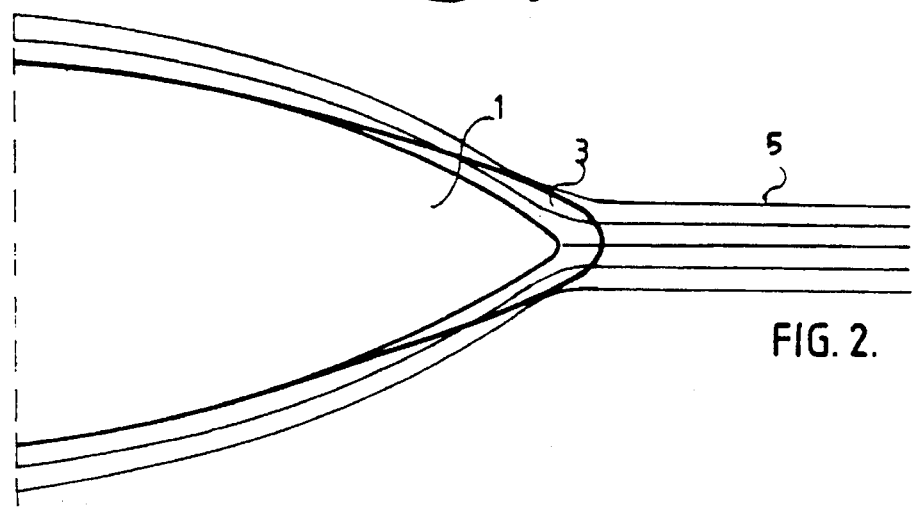
FIG. 2 presents a top view of the bow section of the ship of FIG. 1, with a diagram of the streamlines formed during the propulsion of the ship.
Figure 3:
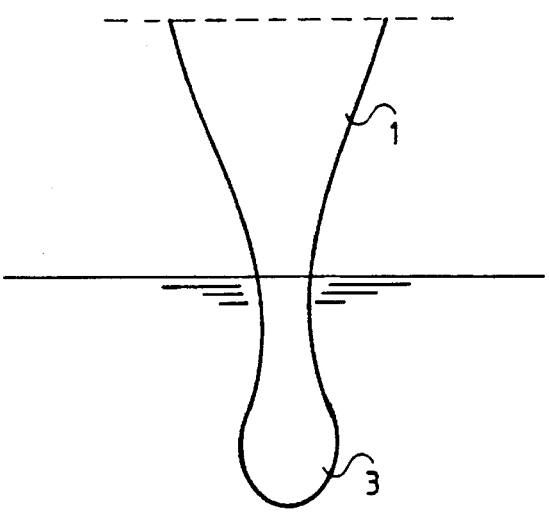
FIG. 3 presents a front view of a fore body section of the ship of FIG. 1.
Figure 7:
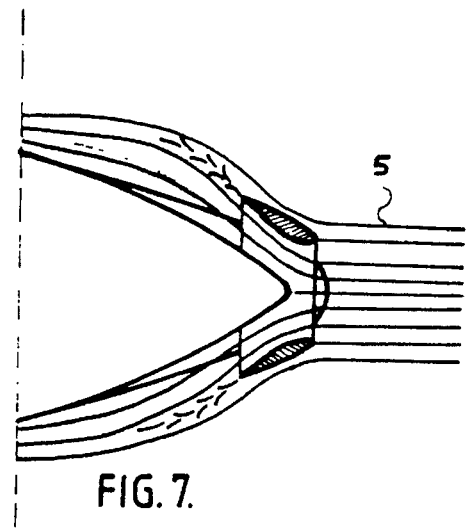
FIG. 7 presents a top view cross section of the fore body of the ship of FIG. 4, with a diagram of the streamlines, formed during the propulsion of the ship.

Initially, in FIGS. 1, 2 and 3, are presented the perspective side view, top view and front view of a vessel 1 with bulb/ball 3, but without the stem duct of the invention. As indicated particularly in FIG. 2, the fluid streamlines around the bow frontal surface maintain the same density before and after the stem, on both sides of the bow frontal surface. The effect of fitting the stem duct of the invention around the ship's bow frontal surface, as diagrammatically and illustratively presented in FIG. 7, is the differentiation of the flow characteristics and especially a reduced density of the streamlines 5, downstream of the stem duct.

Figure 4:
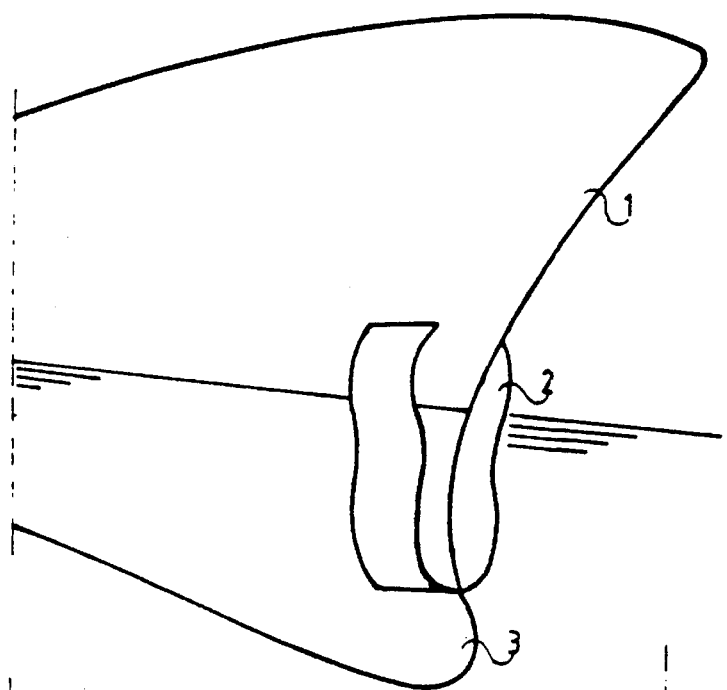
FIG. 4 presents the side view of a ship with bulb/ball stem, additionally fitted with a stem duct with airfoil section, which generally follows the bow configuration and it is closed on top, welded at the sides of the ship.
Figure 5:
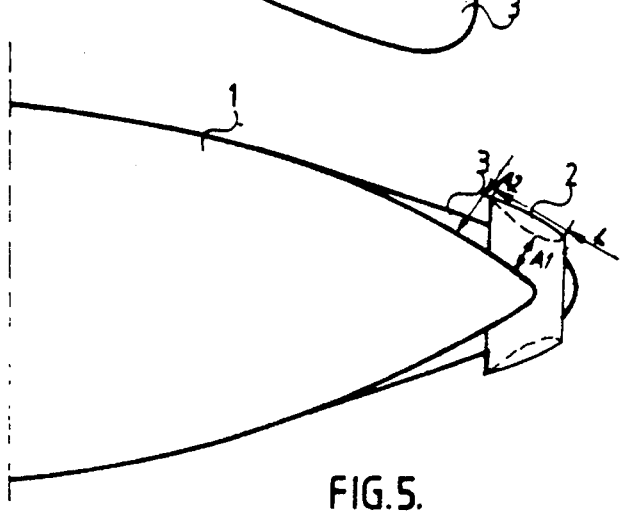
FIG. 5 presents a top view cross section, along the water line of the ship of FIG. 4.
Figure 6:
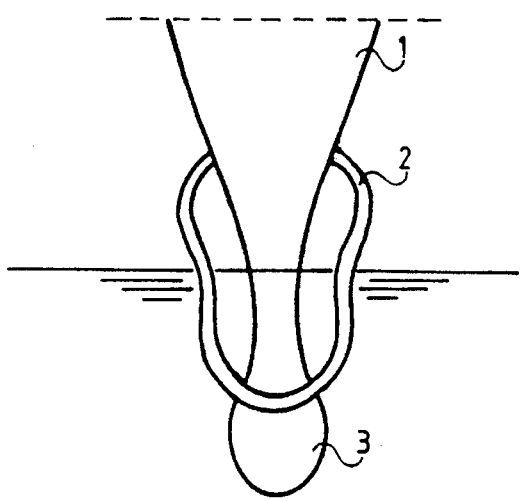
FIG. 6 presents the front view of a fore body section of the ship of FIG. 4.

In FIGS. 4, 5 and 6 are presented the perspective side view, the top view and the front view of a vessel 1 with a bulb/ball 3 and with the airfoil section stem duct 2 of the invention fitted. Naturally, the duct can also be installed to ships without a bulb/ball.

The stem duct 2 of the invention is fitted at the bow of the ship 1 and on both sides of its frontal surface, extending in height above and beneath the ship's waterline. The height of the duct 2 above the ship's waterline is preferably such, that the upper part of the duct exceeds the expected maximum wave height, e.g. 5–6 meters above the waterline. Beneath the waterline, the duct can reach down to the bulb/ball 3, if it exists, of even to cover it, concealing it inside.

The duct 2 generally follows the morphology, i.e. the geometry of the ship's stem lines and it closes at the bottom. The duct can extend in the direction of the flow, fore or aft the bow, or occupy any intermediate position. Preferably, a position is selected, where the duct protrudes fore of the bow in the direction of the flow, by approximately half its length. The duct 2 can be opened or closed at the top. In FIGS. 4, 5, 6 a duct is presented, with converging walls that close on top, attached and welded to the ship's sides, while in FIGS. 8, 9 and 10 a ship is presented, with the stem duct 2 open on top, attached to the ship's sides through an appropriate set of supporting elements 4.

When such supporting elements 4 are used, they should preferably have a hydrodynamic section, convex on both sides, arranged in the direction of the flow, or alternatively they may be pipes of any conventional form.

Figure 8:
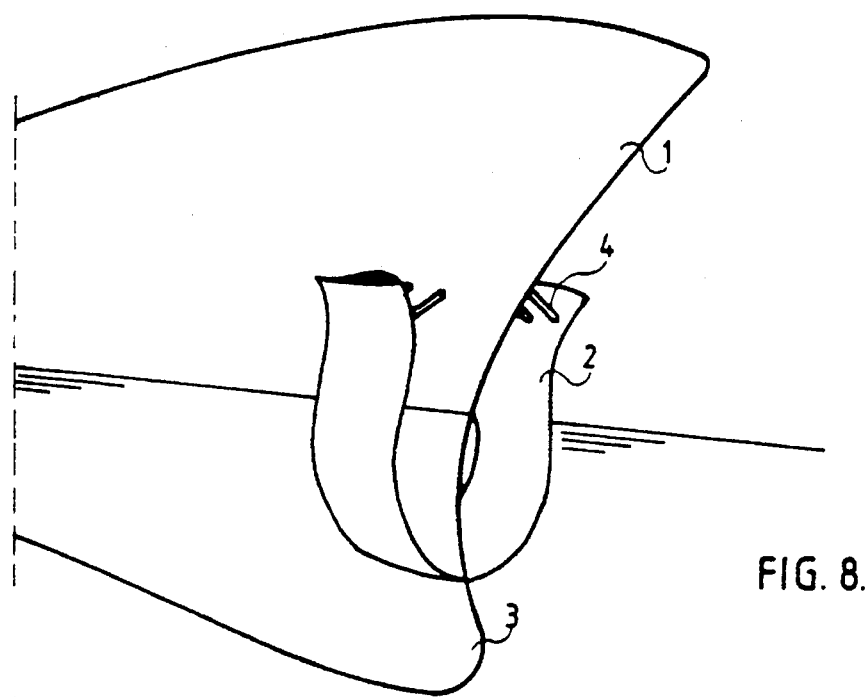
FIG. 8 presents the side view of a ship with bulb/ball stem, additionally fitted with a stem duct with airfoil section, attached to the sides of the ship, through a set of supporting elements.
Figure 9:
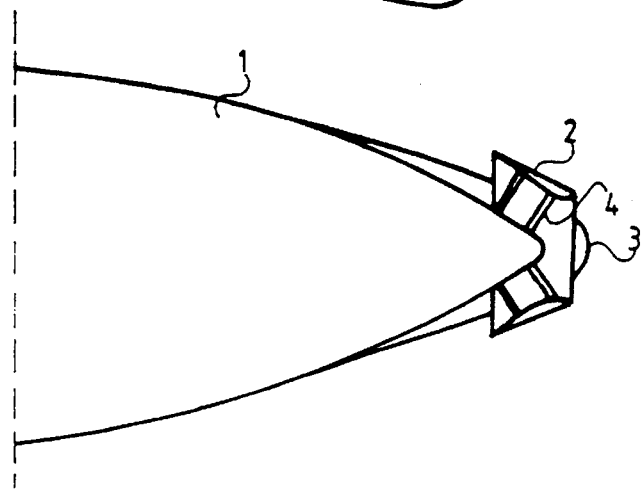
FIG. 9 presents a top view cross section, along the waterline of the ship of FIG. 8.
Figure 10:
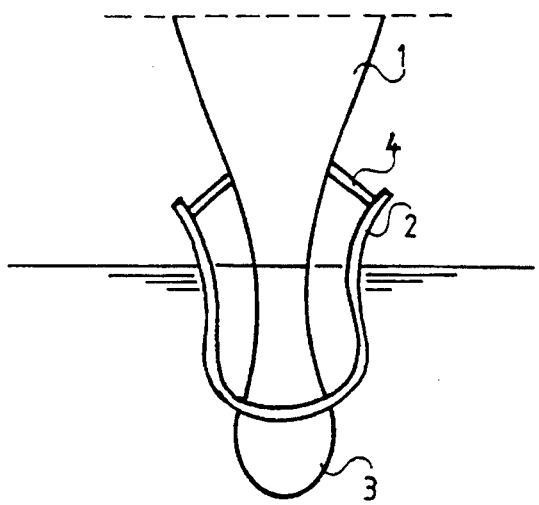
FIG. 10 presents the front view of a fore body section of the ship of FIG. 8.
Figure 15:
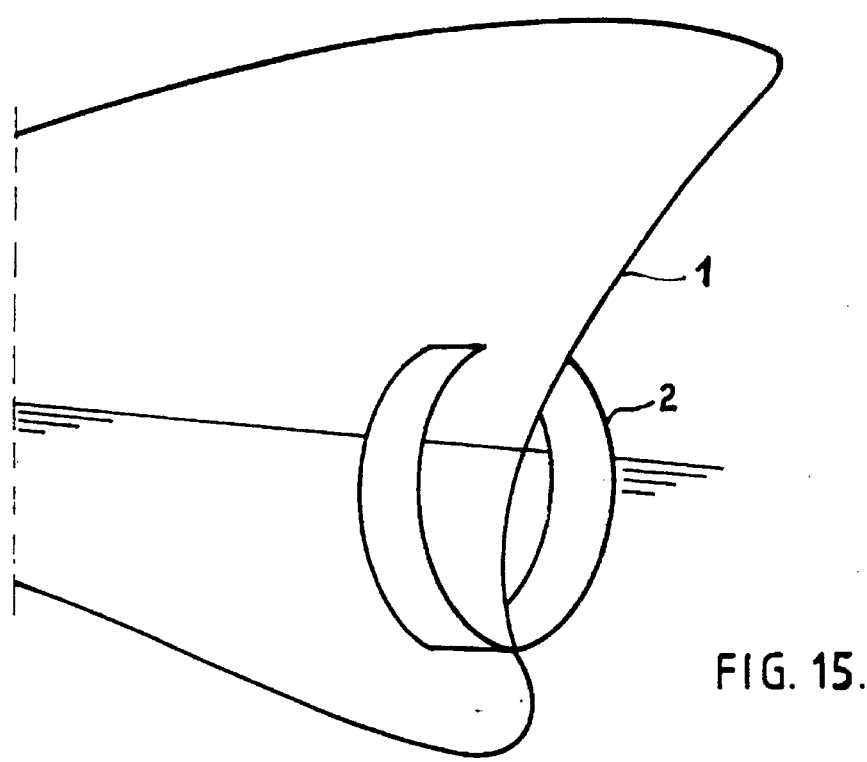
FIG. 15 presents a perspective side view of the ship's fore body section, with the stem duct having a shape different from the ship's stem lines.

In the constructions presented in FIGS. 4, 5, 6 with the duct 2 closed on top and in the construction presented in FIGS. 8, 9, 10 with the duct 2 open on top, attached to the ship 1 through the supporting elements 4, the duct generally appears to follow in shape the general morphology of the bow in the vertical direction. It is possible though that the duct has a different shape. Thus the duct can be arranged around the bow frontal surface, with any geometrical shape, in any case different than the general morphology of the bow frontal surface in the vertical direction, as by way of example is presented in the perspective side view of FIG. 15.

Figure 11:
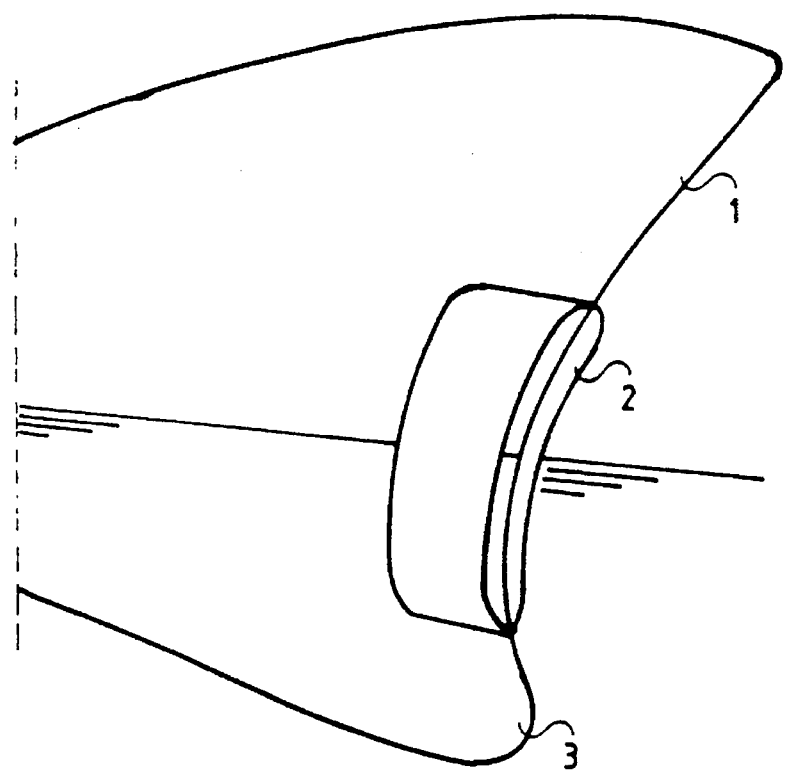
FIG. 11 presents the side view of a ship with bulb/ball stem, with a stem duct beginning exactly at the stem line and generally following the ship's lines.

It is also polluted out that the stem line of a ship, equipped with a stem duct can be either parallel or inclined to the normal vertical, the ship being regarded in still position. The incident line around the duct 2 can also be inclined, with inclination similar or different than the inclination of the stem line. As illustratively presented in FIG. 11, the incident line of duct 2 follows exactly the ship's stem line.

The duct 2 can be used with any bow morphology in general. By way of example, the ship's bow adequately thinned along the line of incidence of sea water may be preferable.

When the stem duct proposed in the present invention is installed, a passage 7 is formed for the flow, between the interior surface or duct 2 and the bow frontal surface. The passage 7 includes at least one inlet opening and at least one outlet opening for the water flow on each side of the ship. The characteristic feature of the duct 2 of the present invention is that the duct walls have an airfoil section in the longitudinal direction of the flow, from the abovementioned at least one inlet opening to the abovementioned at least one outlet opening, on both sides of the ship 1. This airfoil section has its leading edge at the abovementioned at least one flow inlet opening and its trailing edge at the abovementioned at least one flow outlet opening.

The convex side of the airfoil section duct 2 constitutes the internal surface of the duct, so that a higher flow speed and a correspondingly lower pressure is created in the internal convex side with respect to the external side of the duct, as known by the airfoil theory. The duct's external side may have either a flat or a slightly concave surface. Consequently, such a section of the duct 2 of the invention causes the water mass passing through the passage 7 to gain an increased speed in relation to the water mass flowing around the external walls of the duct 2. This differentiation of the flow velocity results in a pressure drop inside the duct and in the creation of depression downstream the duct 2, thus rendering an improved laminar flow around the vessel's bow, decrease of the bow wave height and consequently achieving a better slips, of the vessel.

Figure 12:
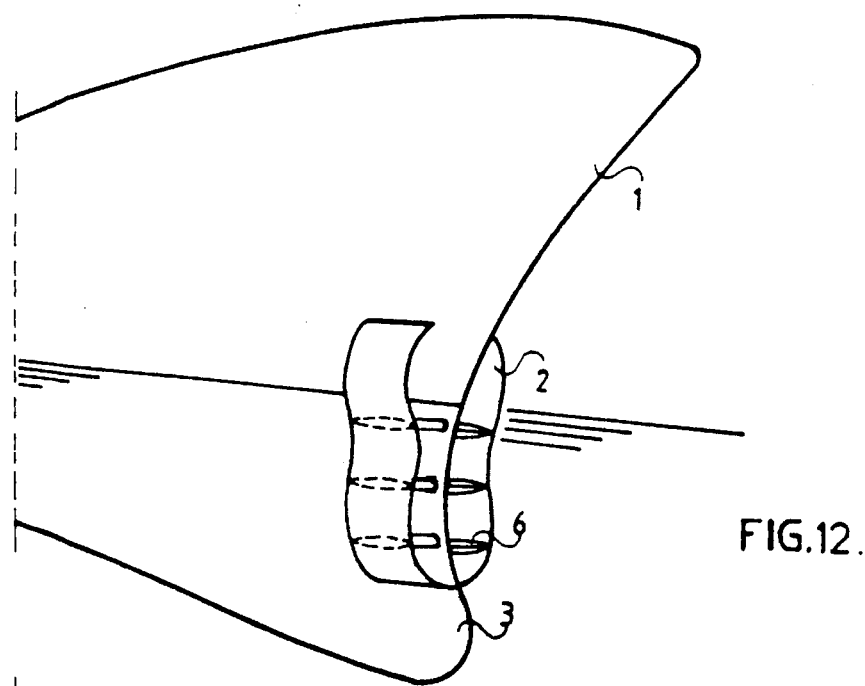
FIG. 12 presents the side view of a ship, where the stem duct is fitted internally with a set of parallel plates, arranged longitudinally to render a laminar flow through stem duct.
Figure 13:
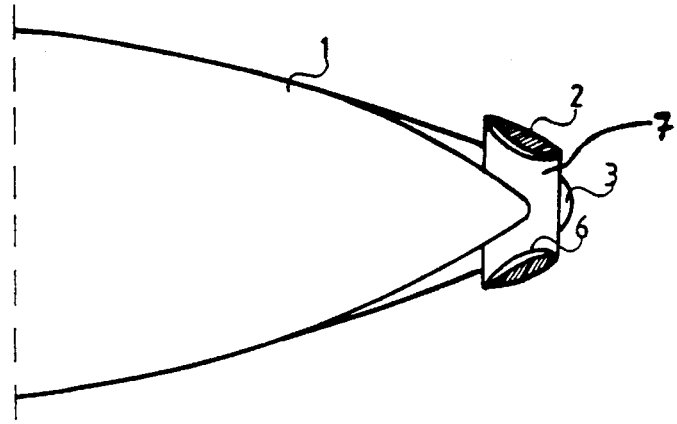
FIG. 13 presents a top cross sectional view of the fore body of the ship of FIG. 12.
Figure 14:
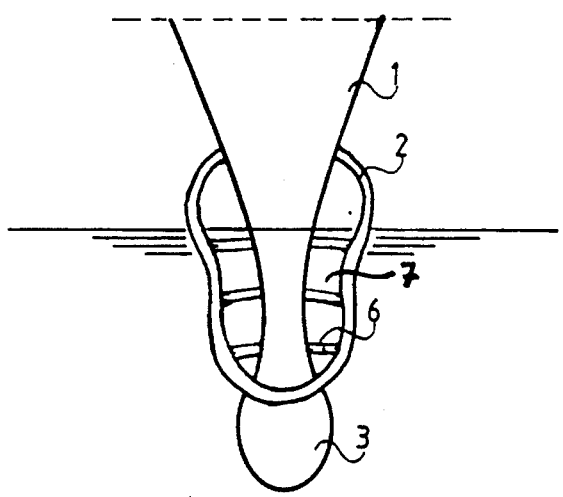
FIG. 14 presents a front view of a fore body section of the ship of FIG. 12.

As presented in FIGS. 12, 13 and 14 the proposed airfoil section duct can have a series of projecting guide plates 6 to render an improved laminar flow, attached longitudinally on its internal surface.

Figure 17:
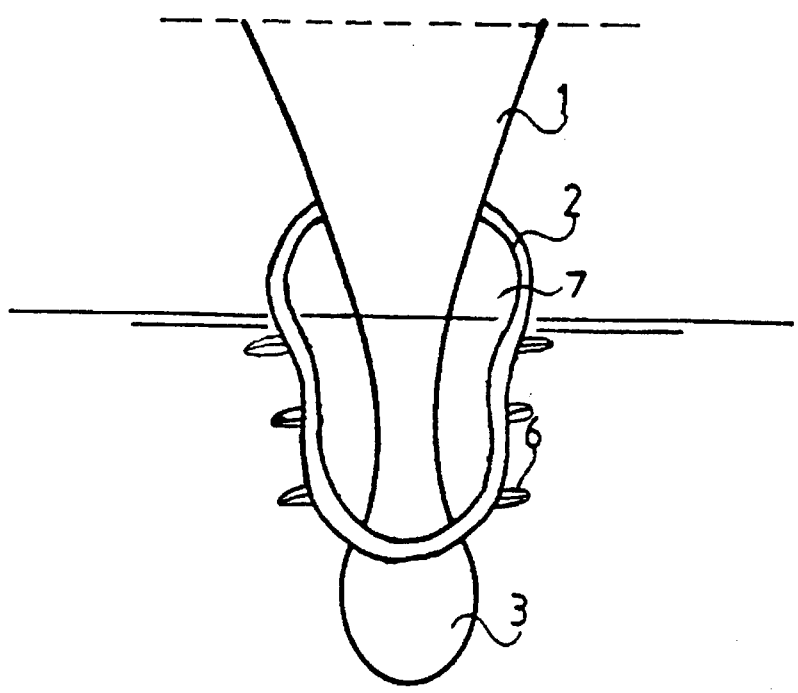
FIG. 17 illustrates the stem duct fitted externally with a set of parallel plates arranged longitudinally.

A similar series of projecting guide plates can also be fitted to the duct's external surface as shown in FIG. 17.

Experiments have been conducted on a model, using the duct of the invention with airfoil coefficients CD=0.012 and CL=1.3. An improvement of the flow characteristics resulted from these experiments. Thus, the towing resistance was reduced by a percentage of around 7.5% and a corresponding horsepower saving of around 10%–12% was achieved for the vessel.

Figure 16:
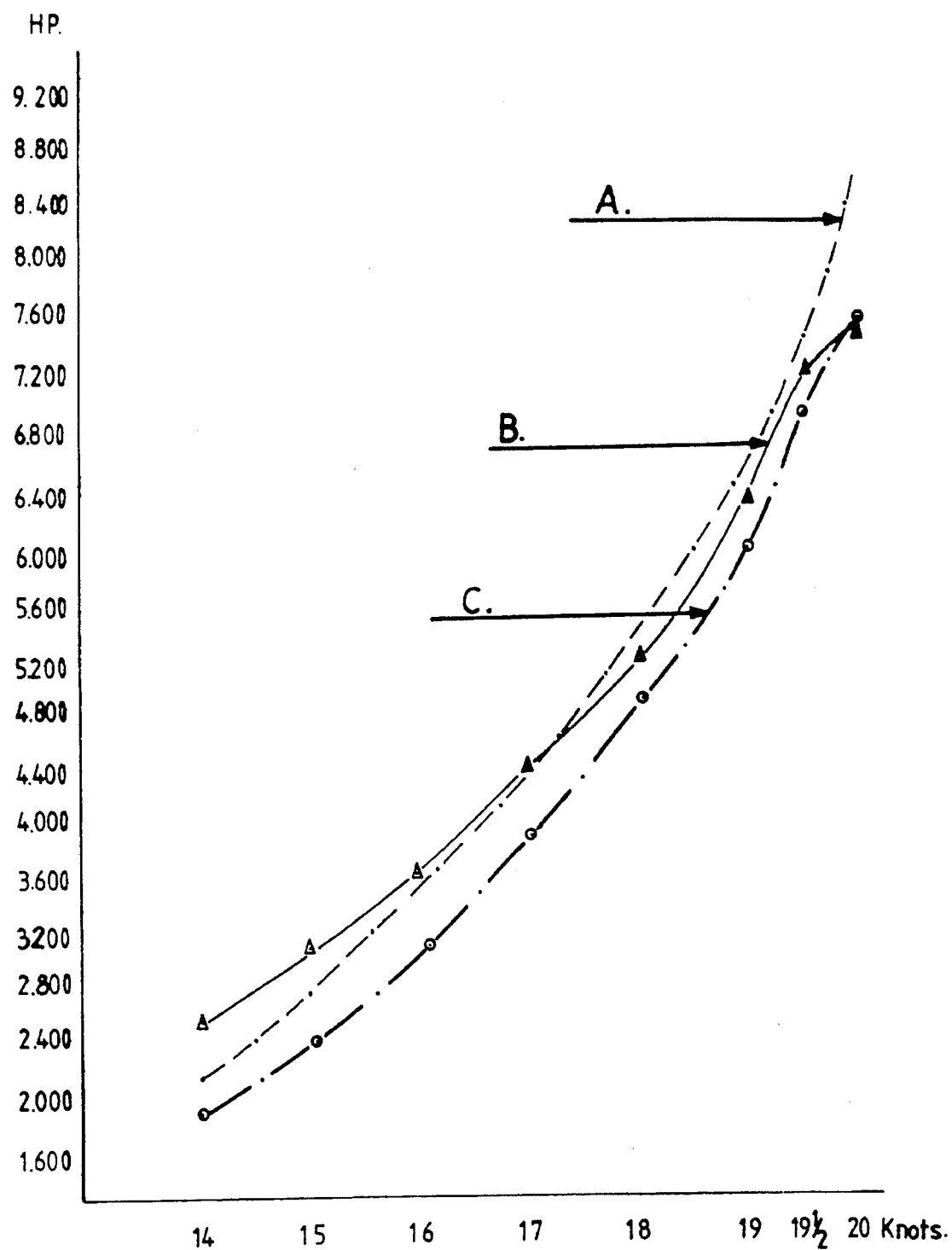
FIG. 16 presents a diagram of horsepower/speed for a common vessel, for a vessel with bulb/ball stem and for a vessel with the stem duct of the invention.

The reduction of the above experimental data onto a real vessel was performed by the FROUDE method. The above experiments were conducted with a bare hull model, without a rudder, a propeller etc. The results are presented in the attached table, where the horsepower values are shown for different values of speed. Three cases are presented: the case of a vessel with a small bulb without the proposed duct of the invention (Case A); the case of the same vessel with an improved bulb, specifically designed by the National Technical University of Athens with the scope of comparing the invention with the state of the art (Case B); and the case of a vessel with a small bulb, as in case A, on which the stem duct of the invention was installed (Case C). The percentages referred to in the attached table indicate a relative increase (+) or decrease (−) of the horsepower, in comparison with case A of a ship with a small bulb and without a stem duct. The same results also appear in the diagram of FIG. 16.

| | VESSEL SPEED VERSUS HORSEPOWER | | | | |
|---|---|---|---|---|---|
| VESSEL SPEED (KNOTS) | CASE A VESSEL WITH SMALL BULB WITHOUT DUCT | CASE B VESSEL WITH IMPROVED BULB | | CASE C VESSEL WITH STEM DUCT OF INVENTION | |
| 14 | 2264 | 2581 | +14% | 2031 | −10% |
| 15 | 2885 | 3213 | +11% | 2548 | −12% |
| 16 | 3652 | 3695 | +1% | 3197 | −12.5% |
| 17 | 4442 | 4508 | +1% | 4066 | −8.5% |
| 18 | 5582 | 5310 | +5% | 5000 | −11.6% |
| 19 | 6672 | 6442 | −3% | 6068 | −9% |
| 19.5 | 7613 | 7361 | −3% | 7029 | −8% |
| 20 | 8779 | 7641 | −13% | 7726 | −12% |

Regarding the proposed stem duct, it must be pointed out that its location on the bow, its height above and beneath the ship's waterline, its length along the direction of the flow, its inclination with respect to the vessel's symmetry axis and its distance from the ship's hull are determined in accordance with the bow morphology, the hull coefficients and the vessel's speed.

At this point it has to be mentioned that the description of the present invention was made by reference to some illustrative embodiments and that the invention is not limited to those. Thus any modification or alteration regarding the shape, the size, the dimensions, the materials and construction and assembly components of the proposed stem duct with an airfoil section is considered to be included in the aims and scope of the present invention, as long as it does not constitute a new inventive step and does not contribute to the technical evolution of the prior art.

From the analysis of the experiments made on the above-mentioned model for the specific airfoil with CD=0.012 and CL=1.3, resulted the following formula for the determination of duct's location i.e. of the airfoil inclination with respect the vessel's symmetry axis, which has to lie in the range of values defined by:

$$A2-A1=0.0425L\pm0.005L$$

where, as presented in the accompanying FIG. 5, A1 is the minimum distance between the duct's interior surface and the ship's bow frontal surface axed A2 is the distance between the duct's trailing edge and the ship's bow frontal surface, where A2 is measured from the innermost end of the duct's trailing edge. Both A1 and A2 are measured along the same waterline and L is the length of the airfoil in the direction of the flow Consequently, a preferred embodiment of the invention implies that all waterlines within the sea water satisfy the above formula and the inclination of the airfoil section is maintained as constant as possible on all waterlines. Naturally, the above formula defines a preferable range of values for the duct airfoil and its spacing from the ship's bow frontal surface. An experimental application of the airfoil section stem duct of the invention has already been made on a real vessel and specifically on the F/B RODOS, under Greek flap registered in Rhodes island, and owned by DANE SEALINE Company.

I claim:
1. A stem duct for use on a ship having a bow including opposed bow sides and a bow frontal surface, said stem duct comprising, wall portions adapted to be mounted to the bow of the ship and to extend forwardly of the bow frontal surface and upwardly on the opposed bow sides from below to above the ship's waterline when the ship is in motion, said stem duct being shaped to substantially follow the shape of the opposed bow sides and having a closed bottom end and defining a water flow passage between an interior surface of said stem duct and the bow, said wall portions each including an airfoil portion extending generally in a longitudinal direction of the ship, said airfoil portions having on the opposed bow sides of the ship a leading edge defining at least one inlet opening of said water flow passage and a trailing edge defining at least one outlet opening of said water flow passage, the airfoil portions having convex interior surfaces and said flow passages converge and then diverge in a rearward direction of the ship, said convex interior surfaces increase the speed of water passing through said flow passages relative to the speed of water flowing around the outer surface of said stem duct, to create a reduced pressure interior to said stem duct and a flow depression downstream from said stem duct.

2. The stem duct of claim 1, wherein said airfoil portions are adapted to be mounted to the opposed bow sides such that an upper end of the airfoil portions are closed.

3. The stem duct of claim 2, comprising vertically spaced guide plates projecting inwardly from the interior surface of each of said wall portions and adapted to extend generally in the longitudinal direction of the ship so as to enhance laminar water flow through said flow passages.

4. The stem duct of claim 2, further comprising vertically spaced guide plates projecting outwardly from an exterior surface of each of said wall portions and adapted to extend generally in the longitudinal direction of the ship.

5. The stem duct of claim 1, comprising supporting elements adapted to be mounted to the opposed bow sides such that said stem duct is open at a top end thereof.

6. The stem duct of claim 5, comprising vertically spaced guide plates projecting inwardly from the interior surface of each of said wall portions and adapted to extend generally in the longitudinal direction of the ship so as to enhance laminar water flow through said flow passages.

7. The stem duct of claim 5, further comprising vertically spaced guide plates projecting outwardly from an exterior surface of each of said wall portions and adapted to extend generally in the longitudinal direction of the ship.

8. The stem duct of claim 1, wherein said side wall portions extend to a height about 5–6 meters above the waterline when the vessel is in motion.

9. A stem duct for use on a ship having a bow including opposed bow sides and a bow frontal surface, said stem duct comprising, wall portions adapted to be mounted to the bow of the ship and to extend forwardly of the bow frontal surface and upwardly on the opposed bow sides from below to above the ship's waterline when the ship is in motion, said stem duct having a closed bottom end and defining a water flow passage between an interior surface of said stem duct and the bow, said wall portions each including an airfoil portion extending generally in a longitudinal direction of the ship, said airfoil portions having on the opposed bow sides of the ship a leading edge defining at least one inlet opening of said water flow passage and a trailing edge defining at least one outlet opening of said water flow passage, said airfoil portions being adapted to be mounted to the opposed bow sides such that an upper end of the airfoil portions are closed, the airfoil portions having convex interior surfaces and said flow passages converge and then diverge in a rearward direction of the ship, said convex interior surfaces increase the speed of water passing through said flow passages relative to the speed of water flowing around the outer surface of said stem duct, to create a reduced pressure interior to said stem duct and a flow depression downstream from said stem duct, and vertically spaced guide plates projecting from each of said wall portions and adapted to extend generally in the longitudinal direction of the ship.

10. A stem duct for use on a ship having a bow including opposed bow sides and a bow frontal surface, said stem duct comprising, wall portions adapted to be mounted to the bow of the ship and to extend forwardly of the bow frontal surface and upwardly on the opposed bow sides from below to above the ship's waterline when the ship is in motion, said stem duct having a closed bottom end and defining a water flow passage between an interior surface of said stem duct and the bow, said wall portions each including an airfoil portion extending generally in a longitudinal direction of the ship, said airfoil portions having on the opposed bow sides of the ship a leading edge defining at least one inlet opening of said water flow passage and a trailing edge defining at least one outlet opening of said water flow passage, supporting elements adapted to be mounted to the opposed bow sides such that said stem duct is open at a top end thereof, the airfoil portions having convex interior surfaces and said flow passages converge and then diverge in a rearward direction of the ship, said convex interior surfaces increase the speed of water passing through said flow passages relative to the speed of water flowing around the outer surface of said stem duct, to create a reduced pressure interior to said stem duct and a flow depression downstream from said stem duct, and vertically spaced guide plates projecting from each of said wall portions and adapted to extend generally in the longitudinal direction of the ship.

11. A stem duct for reducing the resistance to propulsion of a vessel by water, the vessel having a bow and a bottom edge, said stem duct comprising a front end, a rear end, an upper end, a concave base portion and a pair of side wall portions forming a generally U-shape, said side wall portions having a length, said base portion being adapted to be mounted directly to the bow of the vessel above the bottom edge such that said stem duct extends forwardly of the bow by approximately one-half of said length of said wall portions and said side wall portions extend vertically upwardly on opposed sides of the vessel from below to above the vessels's waterline when the vessel is in motion, said side wall portions extend generally in a longitudinal direction on the opposed sides of the vessel and are spaced outwardly from the opposed sides so as to form passages for water flow therebetween, said passages including an inlet opening adjacent said front end, an outlet opening adjacent said rear end and an upper opening adjacent said upper end, said passages converging and then diverging in a rearward direction between said inlet opening and said outlet opening, and horizontal support elements adapted to connect said wall portions to the opposed sides of the vessel adjacent said upper end.

12. The stem duct of claim 11, wherein said side wall portions are shaped to substantially follow the shape of the opposed sides of the vessel.

13. The stem duct of claim 11, comprising vertically spaced guide plates projecting inwardly from an interior surface of each of said side wall portions and adapted to extend generally in the longitudinal direction of the ship so as to enhance laminar water flow through said passages.

14. The stem duct of claim 11, comprising vertically spaced guide plates projecting outwardly from an exterior surface of said side wall portions and adapted to extend generally in the longitudinal direction of the ship so as to enhance laminar water flow through said passages.

15. The stem duct of claim 11, wherein said side wall portions comprise a concave exterior surface.

16. A stem duct for reducing the resistance to propulsion of a vessel by water, said stem duct comprising a front end, a rear end, an upper end, a concave base portion and a pair of side wall portions forming a generally U-shape, said base portion being adapted to be mounted directly to the bow of the vessel such that said stem duct extends forwardly of the bow and said side wall portions extend vertically upwardly from below to above the vessel waterline when the vessel is in motion, said side wall portions extending generally in a longitudinal direction on opposed sides of the vessel and being substantially constantly spaced outward relative to the opposed sides in a vertical direction so as to form passages for water flow therebetween, said upper end of said side wall portions being securable directly to the opposed sides of the vessel to form a closed upper end, said passages each including an inlet opening adjacent said front end and an outlet opening adjacent said rear end, and said flow passages converge and then diverge in a rearward direction of the ship between said inlet opening and said outlet opening.

17. The stem duct of claim 16, wherein said side wall portions are flat.

18. The stem duct of claim 16, wherein said side wall portions comprise a concave exterior surface portion.

19. The stem duct of claim 16, wherein said side wall portions extend to a height about 5–6 meters above the waterline when the vessel is in motion.

* * * * *